(12) United States Patent
Kobayashi et al.

(10) Patent No.: US 9,938,937 B2
(45) Date of Patent: Apr. 10, 2018

(54) OIL MIST SEPARATOR

(71) Applicant: MAHLE FILTER SYSTEMS JAPAN CORPORATION, Tokyo (JP)

(72) Inventors: Akihiro Kobayashi, Niiza (JP); Terumoto Mochizuki, Saitama (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 156 days.

(21) Appl. No.: 14/949,172

(22) Filed: Nov. 23, 2015

(65) Prior Publication Data

US 2016/0177890 A1 Jun. 23, 2016

(30) Foreign Application Priority Data

Dec. 18, 2014 (JP) ................................ 2014-255668

(51) Int. Cl.
*B01D 50/00* (2006.01)
*F02M 35/02* (2006.01)
(Continued)

(52) U.S. Cl.
CPC ....... *F02M 35/0216* (2013.01); *B01D 39/083* (2013.01); *B01D 39/1623* (2013.01); *B01D 45/08* (2013.01); *B01D 50/002* (2013.01); *F01M 13/04* (2013.01); *F02M 35/02441* (2013.01); *F01M 2013/0433* (2013.01); *F01M 2013/0438* (2013.01)

(58) Field of Classification Search
CPC ......... F02M 35/0216; F02M 35/02441; B01D 50/002; B01D 45/08; B01D 39/083; B01D 39/1623; F01M 13/04; F01M 2013/0433; F01M 2013/0438
See application file for complete search history.

(56) References Cited

U.S. PATENT DOCUMENTS 7,799,109 B2  9/2010  Dunsch et al.
8,252,079 B2  8/2012  Gruhler et al.
(Continued)

FOREIGN PATENT DOCUMENTS

DE  10 2006 024 817 A1  12/2007
DE  10 2012 223 643 A1  6/2014
(Continued)

OTHER PUBLICATIONS

Extended European Search Report, dated May 17, 2016, 6 pages.

*Primary Examiner* — Dung H Bui
(74) *Attorney, Agent, or Firm* — Foley & Lardner LLP (57) ABSTRACT

A separator unit of an oil mist separator comprises a front unit including a perforated plate and a plurality of holding studs extending rearward from the perforated plate, a rear unit placed behind the perforated plate and including a base plate that is to be intimately put on a rear surface of the perforated plate and has an opening sized to permit insertion of the holding studs of the front unit, a plurality of connecting studs extending rearward from the base plate and an impinge plate held by leading ends of the connecting studs, and a fiber material piece put on the impinge plate, wherein when the front unit is coupled with the rear unit having the holding studs inserted through the opening of the base plate, the fiber material piece is sandwiched between the leading ends of the holding studs and the impinge plate.

9 Claims, 9 Drawing Sheets (51) Int. Cl.
*F01M 13/04* (2006.01)
*B01D 39/08* (2006.01)
*B01D 39/16* (2006.01)
*B01D 45/08* (2006.01)
*F02M 35/024* (2006.01)

(56) References Cited

U.S. PATENT DOCUMENTS

| | | |
|---|---|---|
| 8,573,188 B2 | 11/2013 | Braun et al. |
| 9,435,236 B2 * | 9/2016 | Zitarosa .............. F01M 13/0011 |
| 2005/0092267 A1 * | 5/2005 | Nonaka .............. F01M 13/0416 |
| | | 123/41.86 |
| 2015/0337698 A1 | 11/2015 | Ruppel et al. |
| 2016/0032798 A1 * | 2/2016 | Herman ................ B01D 45/08 |
| | | 95/268 |
| 2016/0177890 A1 * | 6/2016 | Kobayashi ........... B01D 39/083 |
| | | 55/327 |

FOREIGN PATENT DOCUMENTS

| | | |
|---|---|---|
| JP | 59-514 U | 1/1984 |
| JP | 60-84714 U | 6/1985 |
| JP | 6-76614 U | 10/1994 |
| JP | 2008-297938 A | 12/2008 |
| JP | 2009-507157 A | 2/2009 |
| JP | 2009-121281 A | 6/2009 |
| JP | 2010-248935 A | 11/2010 |
| WO | WO 2010/017903 A1 | 2/2010 |
| WO | WO 2013/179829 A1 | 12/2013 |

* cited by examiner

OIL MIST SEPARATOR

BACKGROUND OF THE INVENTION

1. Field of the Invention

The present invention relates to oil mist separators for an internal combustion engine, and more particularly to the oil mist separators of a type that separates oil mist from blow-by gas produced in the internal combustion engine.

2. Description of the Related Art

In current days, for protecting the environment from pollution, internal combustion engines for motor vehicles are usually provided with a blow-by gas processing system through which the blow-by gas leaking from the combustion chambers to the crankcase is led into an intake system of the engine for burning unburnt components of the blow-by gas. Since the blow-by gas passing through the crankcase contains oil mist that would lower the performance of the intake system, an oil mist separator is usually provided in for example a cylinder head cover for separating and removing the oil mist from the blow-by gas.

Some of such oil mist separators are disclosed in Japanese Laid-open Patent Application (tokkai) 2009-121281 and Published International Patent Application 2013/179829. The oil mist separator disclosed in the former generally comprises a separator chamber, a partition wall installed in the separator chamber, a plurality of openings formed in the partition wall and an impinge wall installed in the separator chamber at a position downstream of the partition wall. In operation of the engine, the blow-by gas is forced to pass through the openings. With this passing, the blow-by gas is highly accelerated before impinging against the impinge wall, and thus the oil mist in the blow-by gas is suitably separated and removed. The other oil mist separator disclosed in the latter is substantially the same as that of the former except that in the latter, the impinge wall is lined or covered with a fiber laminate for improving the oil mist separation and removing.

SUMMARY OF THE INVENTION

It has been revealed that the oil mist separator disclosed in the latter (viz., Published International Patent Application 2013/179829) exhibits a satisfied oil mist separation performance due to provision of the fiber laminate on the impinge wall.

However, in the oil mist separator of this publication, fixing the fiber laminate to the impinge wall is entirely made by only bonding or welding, and thus, it sometimes occurs that the fiber laminate comes off from the impinge wall particularly after long use. Furthermore, the work for bonding or welding the fiber laminate to a desired position of the impinge wall is not easy.

Accordingly, an object of the present invention is to eliminate the above-mentioned drawbacks of the known oil mist separator.

In accordance with a first aspect of the present invention, there is provided an oil mist separator which comprises a housing body through which an oil mist containing gas flows, the housing body including upper and lower members that are coupled to constitute therebetween a gas flow passage for the oil mist containing gas; and a separator unit installed in the gas flow passage, the separator unit comprising a front unit including a perforated plate and a plurality of holding studs extending rearward from the perforated plate; a rear unit placed behind the perforated plate, the rear unit including a base plate that is to be intimately put on a rear surface of the perforated plate and has an opening sized to permit insertion of the holding studs of the front unit, a plurality of connecting studs extending rearward from the base plate and an impinge plate held by leading ends of the connecting studs; and a fiber material piece put on a front surface of the impinge plate, wherein when the front unit is coupled with the rear unit having the holding studs passed through the opening of the base plate, the fiber material piece is sandwiched between the leading ends of the holding studs and the impinge plate.

In accordance with a second aspect of the present invention, there is provided an oil mist separator which comprises a housing body through which an oil mist containing gas flows, the housing body including upper and lower members that are coupled to constitute therebetween a gas flow passage for the oil mist containing gas and have at respective inner surfaces mounting grooves that constitute an endless mounting groove when the upper and lower members are coupled; and a separator unit installed in the gas flow passage, the separator unit comprising a front unit including a perforated plate and a plurality of holding studs extending rearward from the perforated plate; a rear unit placed behind the perforated plate, the rear unit including a base plate that is to be intimately put on a rear surface of the perforated plate and has an opening sized to permit insertion of the holding studs of the front unit, a plurality of connecting studs extending rearward from the base plate and an impinge plate held by leading ends of the connecting studs; and a fiber material piece put on a front surface of the impinge plate, wherein when the front unit is coupled with the rear unit having the holding studs passed through the opening of the base plate, the fiber material piece is sandwiched between the leading ends of the holding studs and the impinge plate, and wherein outer peripheral portions of the perforated plate and the base plate are put in the endless mounting groove of the housing body.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a first embodiment of the present invention will be described in detail with reference to FIGS. 1 to 9.

Figure 1:
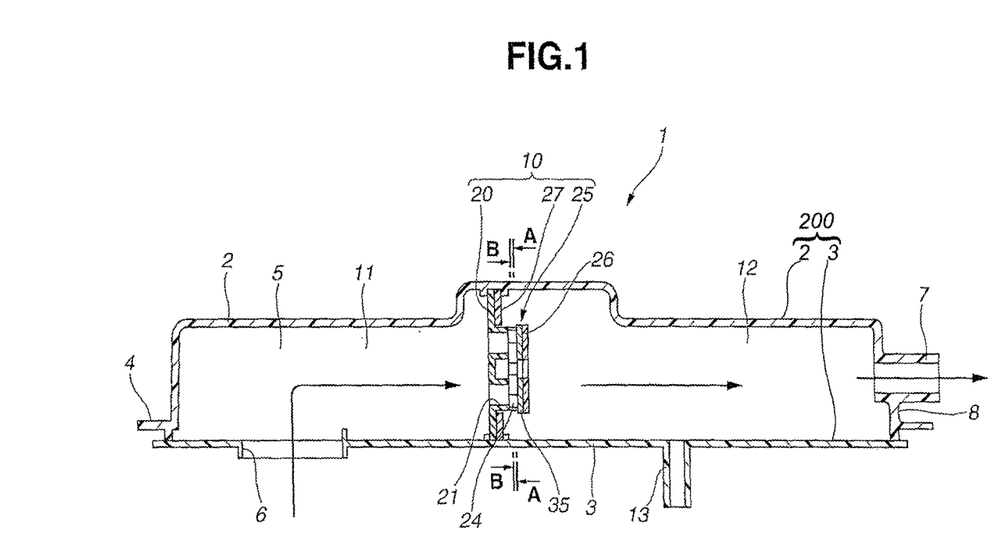
FIG. 1 is a longitudinally sectioned view of an oil mist separator of the present invention.

As is seen from FIG. 1, an oil mist separator 1 of the present invention comprises a housing body 200 having an elongate housing part (or upper cover or upper member) 2 that has an opened bottom portion, and a separator cover (or lower cover or lower member) 3 that is connected to the opened bottom part of the elongate housing part 2.

As seen in FIG. 1, the elongate housing part 2 is arranged and constructed to form a part of an upper wall of a cylinder head cover 4 of synthetic resin.

The separator cover 3 is made of synthetic resin and separately molded from the elongate housing part 2. Bonding and/or welding may be used for connecting the separator cover 3 to the elongate housing part 2. Although, in the illustrated embodiment, the elongate housing part 2 is constructed to integrally form a part of the cylinder head cover 4, the housing part 2 may be provided separately from the cylinder head cover 4.

In the illustrated embodiment, the oil mist separator 1 is arranged to extend in a direction perpendicular to a cylinder row of an associated internal combustion engine (not shown). In other words, the oil mist separator 1 extends in the width direction of the engine.

Figure 5:
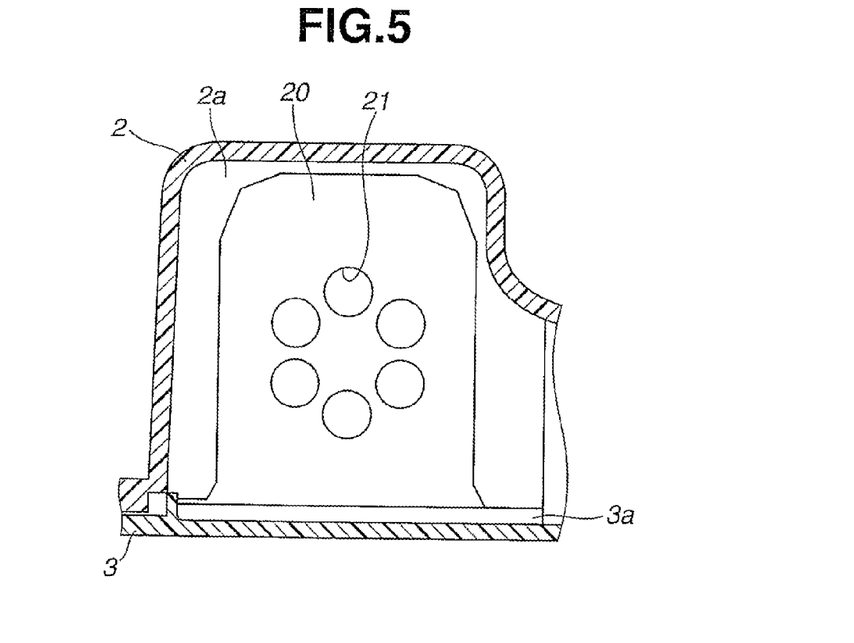
FIG. 5 is a sectioned view of the oil mist separator showing a perforated plate installed therein.

As shown in FIG. 1, between the housing part 2 and the separator cover 3, there is defined an elongate separator chamber 5 that has a rectangular cross section (see FIG. 5).

At one longitudinal end part of the elongate separator chamber 5, there is provided a blow-by gas inlet port 6 and at the other longitudinal end part of the separator chamber 5, there is provided a blow-by gas outlet port 7. Thus, in operation, the blow-by gas led into the elongate separator chamber 5 from the inlet port 6 is forced to flow longitudinally in the separator chamber 5 toward the outlet port 7.

In the illustrated embodiment, the elongate separator chamber 5 is arranged and shaped to extend generally perpendicular to an imaginary plane in and along which respective center axes of the cylinders of the engine extend. However, considering a case in which the engine is mounted in an engine room of a motor vehicle in an inclined attitude, the elongate separator chamber 5 may be arranged and shaped to extend in a direction inclined to the imaginary plane. Preferably, under a rest condition of the motor vehicle, the elongate separator chamber 5 extends in parallel with a horizontal plane.

In the illustrated embodiment, the blow-by gas inlet port 6 is provided in the separator cover 3. Although not shown in the drawings, the blow-by gas inlet port 6 is connected to or communicated with an interior of the engine. While, the blow-by gas outlet port 7 is provided in a downstream end wall 8 of the housing part 2. It is to be noted that the directional terms "upstream" and "downstream" mentioned in the following are to be understood with respect to a normal flow of the blow-by gas in the elongate separator chamber 5.

As is seen from FIG. 1, at a longitudinally middle portion of the separator chamber 5, there is arranged a separator unit 10 that is tightly supported between the housing part 2 and the separator cover 3. As is seen from this drawing, due to provision of this separator unit 10, the elongate separator chamber 5 is divided into two chambers which are an upstream chamber 11 having the blow-by gas inlet port 6 connected thereto and a downstream chamber 12 having the blow-by gas outlet port 7 connected thereto. At the bottom wall of the downstream chamber 12, there is integrally provided a drain pipe 13. More specifically, the drain pipe 13 extends downward from the separator cover 3.

Thus, in operation of the engine, entire amount of the blow-by gas is forced to pass through the separator unit 10 during flowing in the elongate separator chamber 5 from the blow-by gas inlet port 6 to the blow-by gas outlet port 7. As will be described in detail hereinafter, when the blow-by gas passes through the separator unit 10, oil mist is effectively separated from the blow-by gas. The oil mist or oil thus separated forms oil drops. The oil drops drop onto the bottom wall of the downstream chamber 12 and flow to the drain pipe 13. The oil thus led to the drain pipe 13 is discharged to the outside of the oil mist separator 1. The blow-by gas thus free of the oil mist is led to the blow-by gas outlet port 7 and then to an intake system of the associated internal combustion engine for burning unburnt components of the blow-by gas.

In the following, the detail of the separator unit 10 will be described with reference to the drawings, particularly FIGS. 2 to 9.

Figure 2:
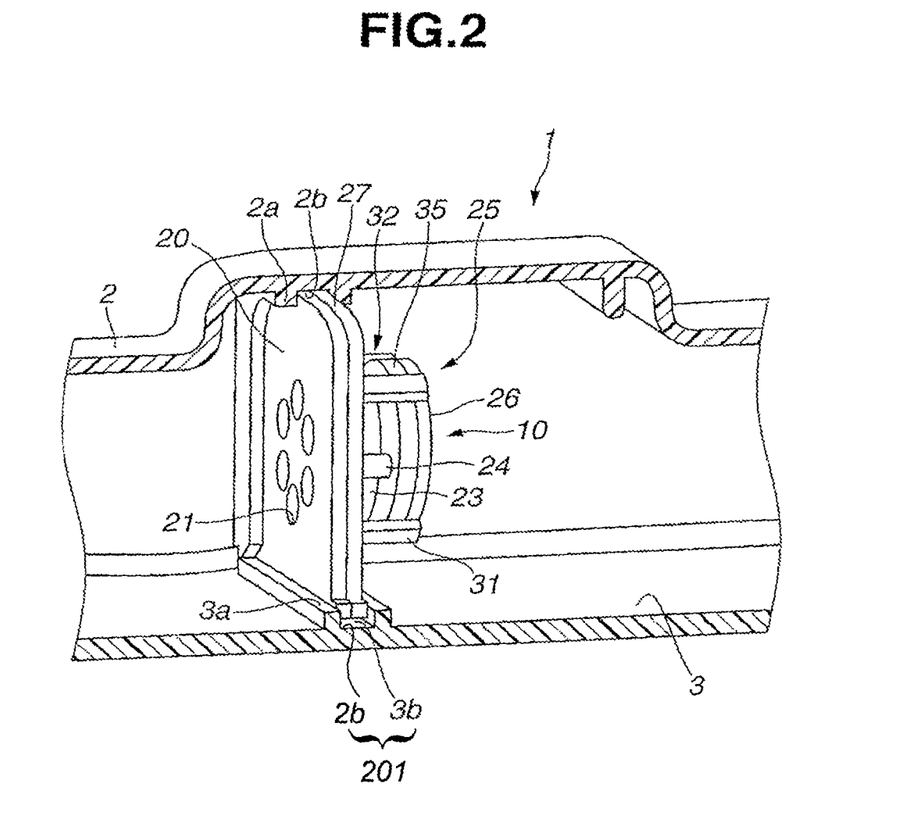
FIG. 2 is an enlarged sectioned and perspective view of an essential part of the oil mist separator of the present invention, which is taken from a front-side position of the oil mist separator.
Figure 3:
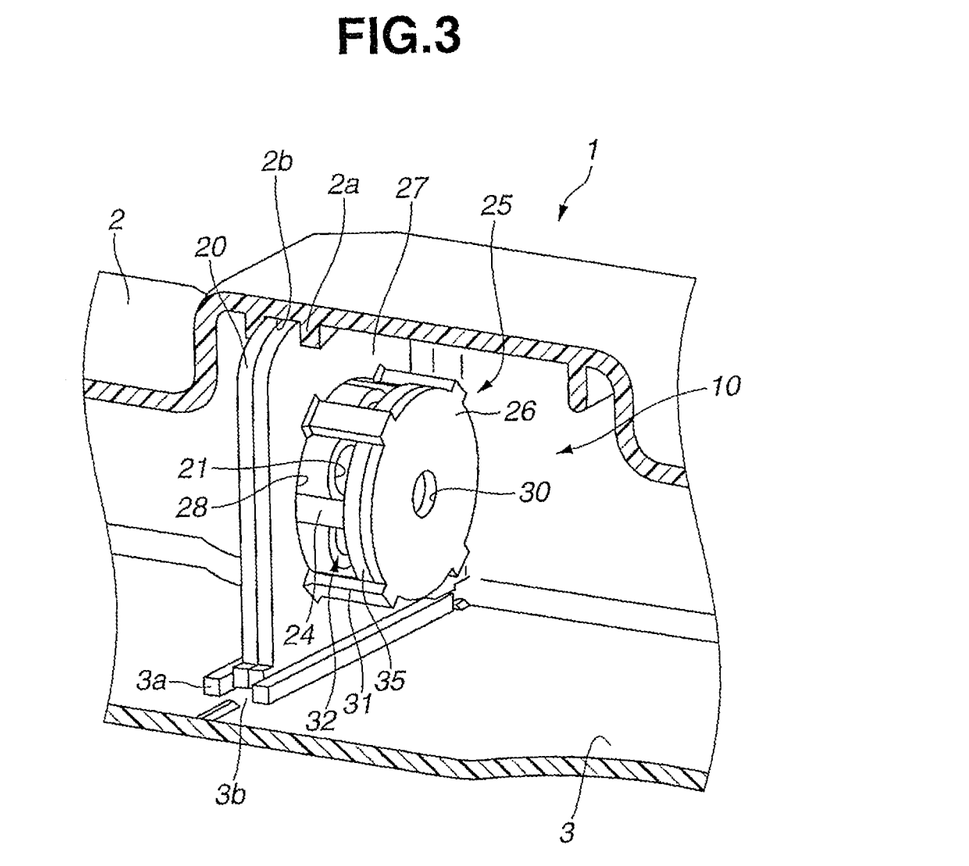
FIG. 3 is a view similar to FIG. 2, but which is taken from a rear-side position of the oil mist separator.

As is seen from FIGS. 2, 3 and 5, the separator unit 10 generally comprises a rectangular perforated plate (a front unit) 20 of synthetic resin that is formed with six small circular openings (orifices) 21 for increasing the flow speed of the blow-by gas, a rear frame 25 of synthetic resin that is equipped with an impinge plate 26 against which the speed increased blow-by gas from the rectangular perforated plate 20 violently impinges, and a fiber material piece 35 that is seated on the impinge plate 26 for improving the oil mist separation.

Figure 4:
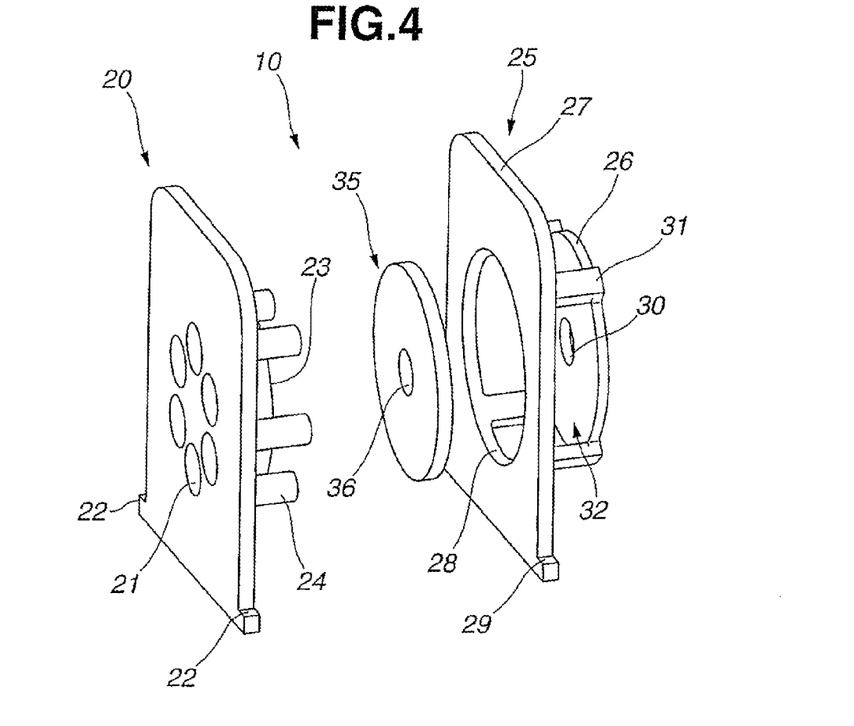
FIG. 4 is a perspective view of a separator unit employed in a first embodiment of the present invention.

As is seen from FIGS. 3 and 4, the rear frame 25 is formed with a base plate (a rear unit) 27 that is integrally formed with the impinge plate 26. As will be described in detail hereinafter, the base plate 27 and the impinge plate 26 are integrally connected to each other through four connecting studs 31. Due to provision of the four connecting studs 31, the base plate 27 and the impinge plate 26 are axially spaced from each other while showing a parallel arrangement therebetween.

As is seen from the drawings, the base plate 27 is rectangular in shape and sized to be neatly and tightly put in the separator chamber 5.

As is best seen from FIG. 4, the rectangular base plate 27 is formed at its central portion with a circular opening 28 and at lower ends of its side edges with projected portions 29.

Figure 6:
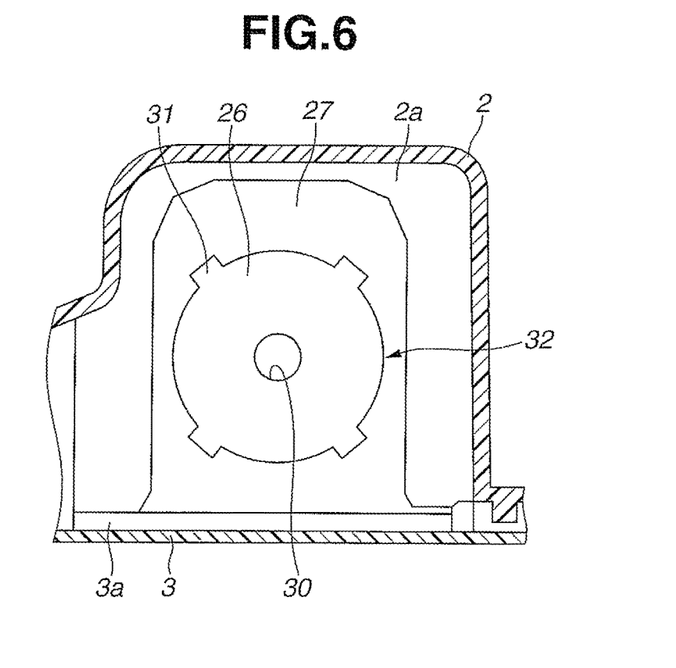
FIG. 6 is a sectioned view of the oil mist separator showing an impinge plate installed therein.

As is seen from FIGS. 4 and 6, the impinge plate 26 is circular and flat in shape and has an outer diameter substantially the same as the diameter of the circular opening 28 of the base plate 27. The circular impinge plate 26 is formed at its center portion with a small circular opening 30.

As is seen from FIG. 4, each of the connecting studs 31 has a rectangular cross section and extends in a direction perpendicular to both the rectangular base plate 27 and the circular impinge plate 26. As shown, a front (or upstream) end of each connecting stud 31 is integrally connected to a peripheral edge of the circular opening 28 and a rear (or downstream) end of the stud 31 is integrally connected to an outer periphery of the circular impinge plate 26. Due to provision of the four connecting studs 31, four rectangular connecting openings 32 are provided between the impinge plate 26 and the base plate 27, as shown.

Figure 8:
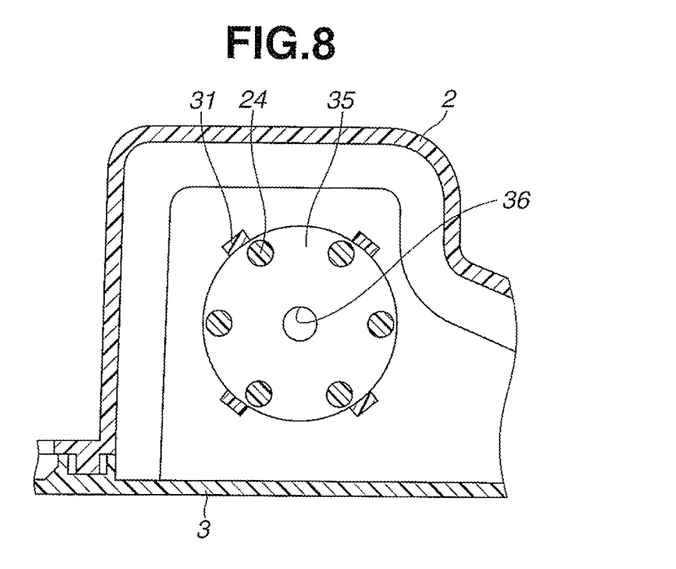
FIG. 8 is an enlarged sectioned view of the separator unit taken along the line B-B of FIG. 1.

As is seen from FIGS. 4 and 8, the fiber material piece 35 is shaped circular and has an outer diameter substantially the same as the diameter of the circular opening 28 of the base plate 27. In other words, the diameter of the circular fiber material piece 35 is substantially the same as that of the circular impinge plate 26.

The circular fiber material piece 35 is formed at a central portion thereof with a small circular opening 36 whose diameter is substantially the same as that of the small circular opening 30 of the impinge plate 26.

As a material of the circular fiber material piece 35, polyester fiber, acrylic fiber, aramid fiber, PPS (polyphenylenesulfide) fiber and/or the like is used. Non-woven fabrics, fabrics such as fleece or the like are also usable as the material of the piece 35.

As is well seen from FIGS. 3 and 4, the rectangular perforated plate 20 has substantially the same shape as the above-mentioned rectangular base plate 27. Thus, the perforated plate 20 has projected portions 22 at lower ends of its side edges.

As is seen from FIG. 5, the six circular openings (orifices) 21 of the perforated plate 20 are circularly arranged.

Figure 7:
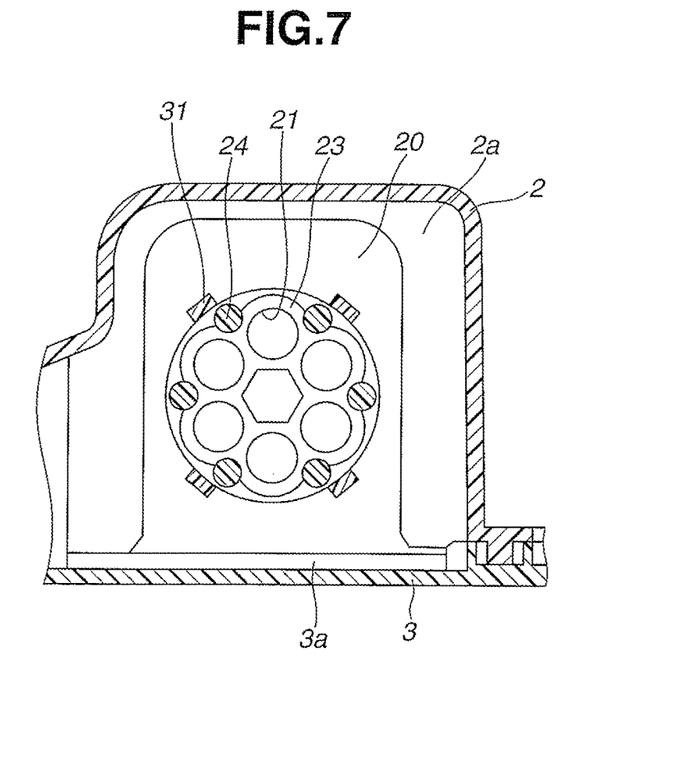
FIG. 7 is an enlarged sectioned view of the separator unit taken along the line A-A of FIG. 1.
Figure 9:
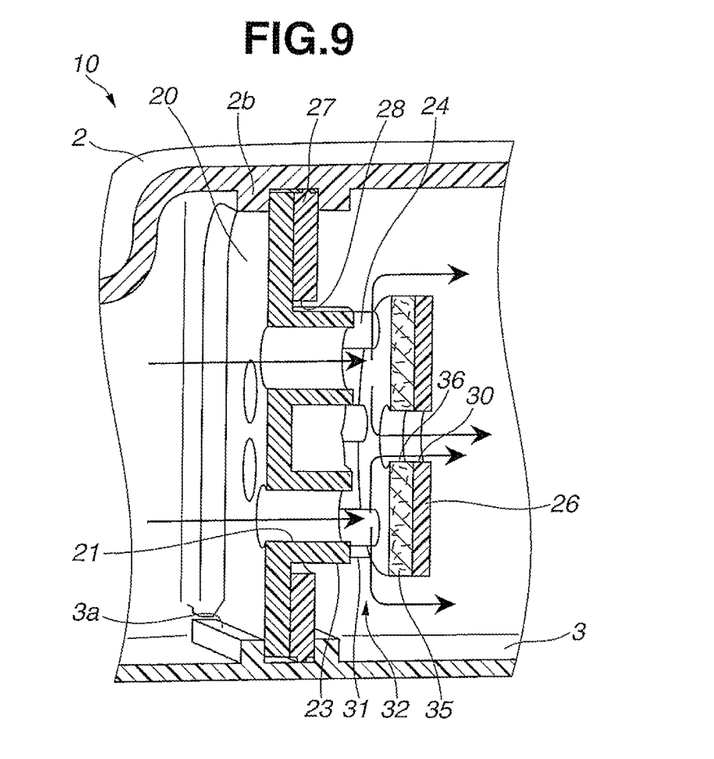
FIG. 9 is a longitudinally sectioned enlarged view of the separator unit.

As is best seen from FIGS. 7 and 9, the six circular openings 21 are cylindrical holes defined in a cylindrically swelled portion 23 integrally formed on a back surface of the perforated plate 20. With such cylindrical holes 21, a straight running stability of the blow-by gas running in the holes 21 is increased.

As is seen from FIGS. 4 and 7, the perforated plate 20 is formed with six holding studs 24 that extend rearward in such a manner as to surround the cylindrically swelled portion 23 (see FIG. 7). Each stud 24 has a circular cross section.

As will be understood from FIGS. 4 and 8, these six holding studs 24 are circularly arranged. For the reasons that will become apparent hereinafter, an imaginary circle defined by most-outer cylindrical parts of the six holding studs has a diameter that is slightly smaller than the diameter of the circular opening 28 of the base plate 27. With this arrangement, upon assembly, each top of the six holding studs 24 presses an outer peripheral portion of the circular fiber material piece 35 against the impinge plate 26 neatly set in the rear frame 25. As is seen from FIG. 4, each holding stud 24 extends perpendicular from the perforated plate 20 beyond the cylindrically swelled portion 23.

The projected part of each holding stud 24 beyond the cylindrically swelled portion 23 is somewhat smaller in length than a distance between the base plate 27 and the impinge plate 26. With this arrangement, upon assembly, the outer peripheral portion of the circular fiber material piece 35 is suitably pressed by the tops of the six holding studs 24, and thus, the circular fiber material piece 35 is stably held on the impinge plate 26. That is, as will be understood from FIGS. 2 and 3, when the perforated plate 20 and the base plate 7 are intimately joined for assembling the separator unit 10, the tops of the six holding studs 24 take given positions to suitably press or compress the outer peripheral portion of the circular fiber material piece 35. Thus, by varying the length of the projected part of each holding stud 24, compression ratio of the outer peripheral portion of the circular fiber material piece 35 is varied. The compression ratio is determined considering both a satisfied oil mist separation performance expected from the oil mist separator 1 and an assured holding of the circular fiber material piece 35 on the impinge plate 26. The six holding studs 24 are equally spaced from one another so as to evenly compress or press the entire of the outer peripheral portion of the circular fiber material piece 35.

When the separator unit 10 is properly assembled, the cylindrically swelled portion 23 and the six holding studs 24, which are integral with and extend from the perforated plate 20, are neatly received in the circular opening 28 of the base plate 27 and the perforated plate 20 and the base plate 27 are intimately joined as is seen from FIGS. 1 to 3. Under this condition, as is seen from FIG. 3, the cylindrically swelled portion 23 is positioned away from the circular fiber material piece 35 and the six holding studs 24 press the outer peripheral portion of the circular fiber material piece 35 against the impinge plate 26. Due to compression of the outer peripheral portion by the studs 24, the circular fiber material piece 35 is assuredly positioned in a radial direction on the impinge plate 26. Furthermore, due to the pressing work of the studs 24, the outer peripheral portion of the circular fiber material piece 35 is compressed at a suitable compression ratio.

The separator unit 10 thus assembled in the above-mentioned manner is then set in the elongate separator chamber 5 in such a manner as is shown in FIG. 1.

For setting the separator unit 10 in the separator chamber 5, the housing part 2 and the separator cover 3 are prepared in a separated manner.

As is seen from FIGS. 1, 2 and 3, for setting the separator unit 10 in the separator chamber 5, the housing part 2 and the separator cover 3 have, at their inner walls, mounting grooves 2b and 3b that constitute an endless groove (an endless mounting groove) 201 extending in and around a cylindrical inner surface of the separator chamber 5, as will be understood from FIGS. 2 and 3. That is, for forming the groove 2b, two elongate and spaced banks 2a are provided on the inner surface of the housing part 2 and for forming the other groove 3b, two elongate and spaced banks 3a are provided on the inner surface of the separator cover 3.

As is seen from FIG. 2, for setting the separator unit 10 in the separator chamber 5, a peripheral portion of the intimately joined flat unit consisting of the perforated plate 20 and base plate 27 is snugly put in the mounting groove 2b, and then the separator cover 3 is temporally connected to the lower open part of the housing part 2 having a lower part of the peripheral portion of the intimately joined flat unit snugly put in the other mounting groove 3b. Then, as is mentioned hereinabove, a suitable bonding technique is used for tightly connecting the housing part 2 and the separator cover 3.

Once the separator unit 10 is properly set in the separator chamber 5 in the above-mentioned manner, the separator unit 10 is suppressed from making a backlash due to a biasing force produced by the circular fiber material piece 35 that is kept compressed by the holding studs 24. Of course, the width of the mounting grooves 2b and 3b is determined so as to suppress or at least minimize the backlash of the separator unit 10.

In the following, operation of the oil mist separator 1 will be described with the aid of FIGS. 1 and 9.

As is seen in FIG. 1 and mentioned hereinabove, under operation of an associated internal combustion engine, the blow-by gas is forced to flow in the separator chamber 5 of the oil mist separator 1 as is indicated by arrows. During this flow, the blow-by gas is treated by the separator unit 10 in the following manner.

As is seen from FIG. 9, the blow-by gas flowing from the blow-by gas inlet port 6 (see FIG. 1) is forced to flow in the six small circular openings (orifices) 21 of the perforated plate 20. During this, due to reduction in passage area, the flowing speed of the blow-by gas is increased. The blow-by gas thus increased in flowing speed is forced to impinge against the impinge plate 26 after passing through the fiber material piece 35. During this flow, oil mist in the blow-by gas is mainly separated by the fiber material piece 35 and some of the separated oil mist get stuck onto the impinge plate 26, and on the impinge plate 26, the separated oil mist or oil forms larger oil drops. The larger oil drops fall down onto the inner wall of the separator cover 3 by their gravity from lower ends of the fiber material piece 35 and impinge plate 26, and the oil thus accumulated is forced to flow down toward the drain pipe 13 (see FIG. 1) and drained into the outside of the oil mist separator 1. The blow-by gas thus free of the oil mist is forced to run in radially outward direction from the four rectangular connecting openings 32 (see FIG. 3) and then toward the blow-by gas outlet port 7 after changing its flowing direction. Part of the oil mist free blow-by gas is forced to flow toward the blow-by gas outlet port 7 through the smaller center opening 36 of the fiber material piece 35 and the smaller center opening 30 of the impinge plate 26.

In the following, advantages of the oil mist separator 1 of the present invention will be described.

As will be understood from FIGS. 2 and 4, once the perforated plate 20 and the base plate 27 are intimately and correctly put together, the holding studs 24 press the outer peripheral portion of the circular fiber material piece 35 against the impinge plate 26. Thus, the circular fiber material piece 35 can be tightly attached to the impinge plate 26 without usage of any bonding material. Due to provision of the four connecting studs 31, undesired lateral slippage or displacement of the circular fiber material piece 25 on the impinge plate 26 is suppressed or at least minimized.

As will be understood from FIGS. 1, 2 and 3, the separator unit 10 can be easily and tightly set and mounted in the separator chamber 5 by only putting the outer peripheral portions of the intimately jointed two plates (viz., perforated plate 20 and base plate 27) into the mounting grooves 2b and 3b. This setting and mounting are made without usage of any bonding material. More specifically, there is no need of bonding the outer peripheral portions of the two plates 20 and 27 to the housing part 2 and separator cover 3.

If the separator cover 3 is detachably connected to the housing part 2 by using mechanical binders or the like, the separator unit 10 can be dismounted from the separator chamber 5 with ease. In this case, the circular fiber material piece 35 can be easily replaced with a new one.

In the above-mentioned first embodiment, the perforated plate 20 has the same size as the base plate 27. However, if desired, the size of the perforated plate 20 may be reduced to that of the circular fiber material piece 35. In this case, the base plate 27 is provided with a holder for holding the smaller perforated plate 20.

For examining the performance of the oil mist separator of the above-mentioned first embodiment of the present invention, various tests were carried out together with comparative examples. Each comparative example had the same construction as the corresponding oil mist separator of the first embodiment except that in the comparative example, the circular fiber material piece 35 was not employed.

Figure 10:
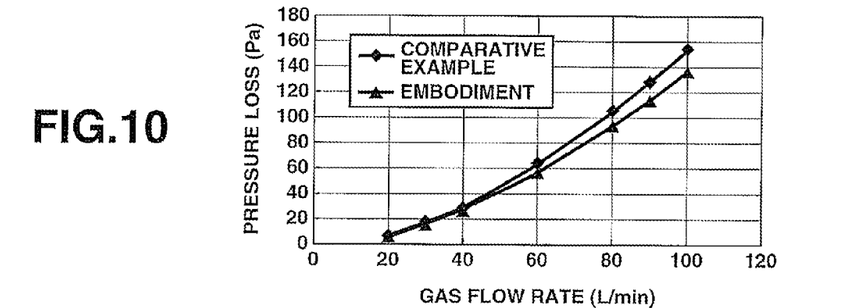
FIG. 10 is a characteristic graph showing both a pressure loss of the oil mist separator of the present invention with respect to a gas flow rate and for its comparison, that of a comparative example.

FIG. 10 shows the results of the test for examining a relationship between a gas flow rate and a pressure loss. As is seen from this graph, the pressure loss of the first embodiment relative to the gas flow rate is clearly low as compared with that of the comparative example.

Figure 11:
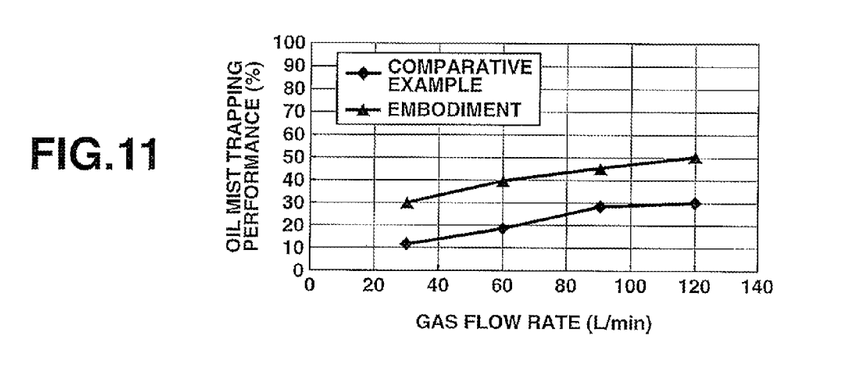
FIG. 11 is a characteristic graph showing an oil mist trapping performance of the oil mist separator of the present invention with respect to the gas flow rate and for its comparison, that of the comparative example.

FIG. 11 shows the results of the test for examining a relationship between the gas flow rate and an oil mist trapping performance. As is seen from this graph, the oil mist trapping performance of the first embodiment relative to the gas flow rate is clearly high as compared with that of the comparative example.

Figure 12:
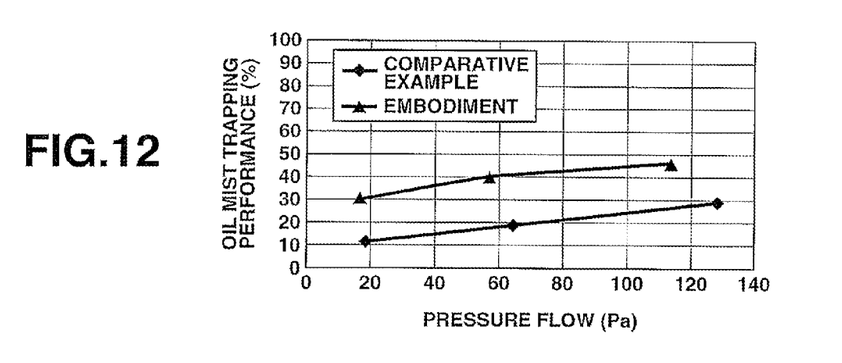
FIG. 12 is a characteristic graph showing an oil mist trapping performance of the oil mist separator of the present invention with respect to a pressure flow and for its comparison, that of the comparative example.

FIG. 12 shows the results of the test for examining a relationship between a pressure flow and the oil mist trapping performance. As is seen from this graph, the oil mist trapping performance of the first embodiment relative to the pressure flow is clearly high as compared with that of the comparative example. That is, in the invention, the oil mist trapping performance and the pressure loss performance, which have a so-called trade-off relation to each other, are obtained in a high level of establishment.

In the following, a separator unit 100 employed in an oil mist separator of a second embodiment of the present invention will be described with reference to FIGS. 13 to 16.

Figure 13:
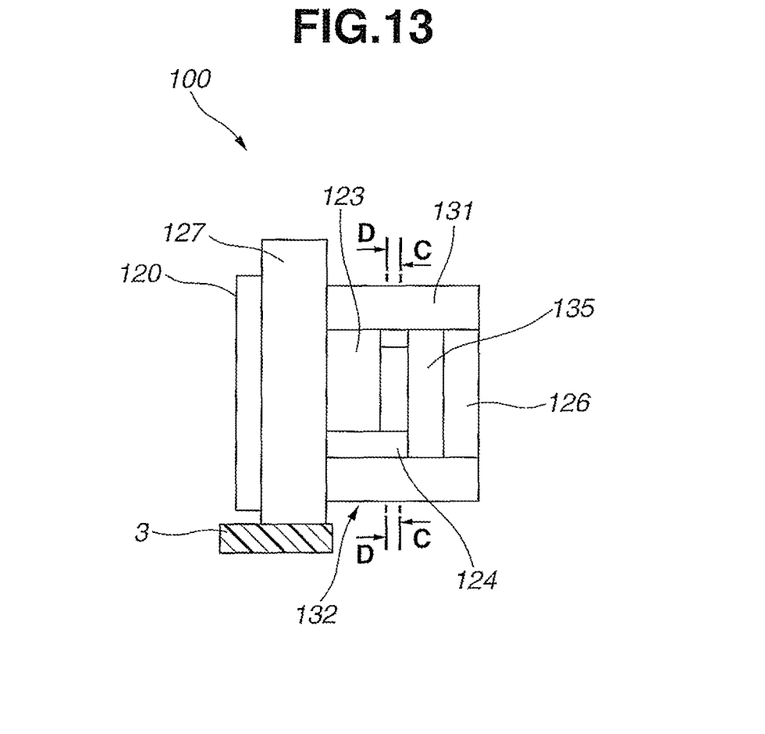
FIG. 13 is a side view of a separator unit employed in a second embodiment of the present invention.
Figure 14:
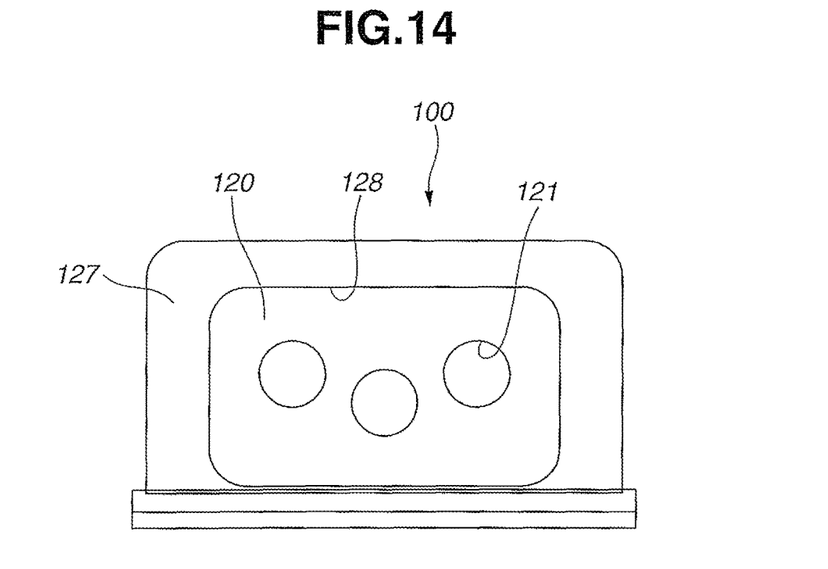
FIG. 14 is a front view of the separator unit employed in the second embodiment of the present invention.

As is seen from these drawings, especially FIG. 13, like in the above-mentioned first embodiment 1, the separator unit 100 employed in the second embodiment comprises a perforated plate 120 that has three small circular openings 121 which are a center one and two side ones that are somewhat higher in position than the center one.

The perforated plate 120 is rectangular in shape and integrally formed with both a rectangularly swelled portion 123 projected rightward in FIG. 13 from a central portion of the perforated plate 120 and four holding studs 124 projected rightward in FIG. 13 from four corner portions of the perforated plate 120.

As is seen from the drawings, especially FIG. 13, the separator unit 100 further comprises a rectangular base plate 127 that is formed at its central portion with a rectangular opening 128.

Figure 15:
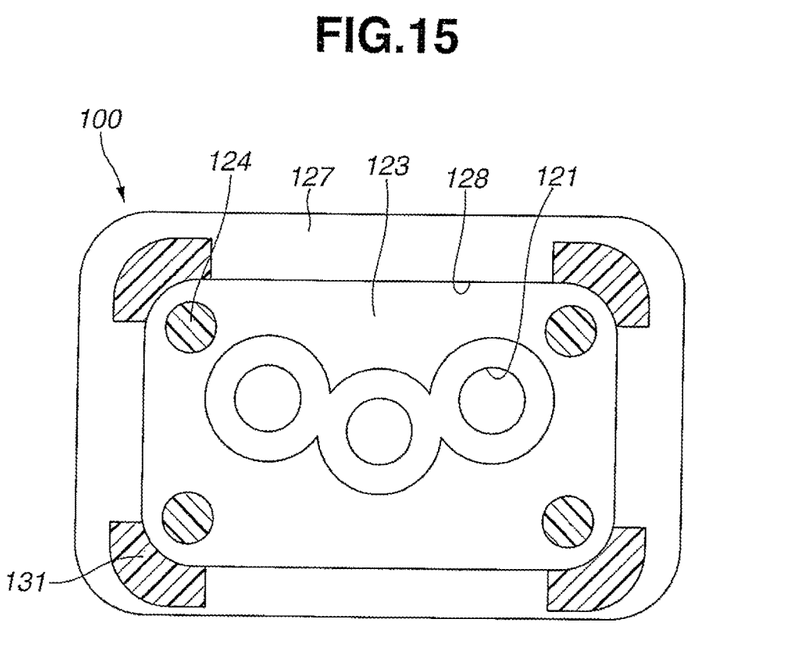
FIG. 15 is a sectioned view of the separator unit taken along the line C-C of FIG. 13.
Figure 16:
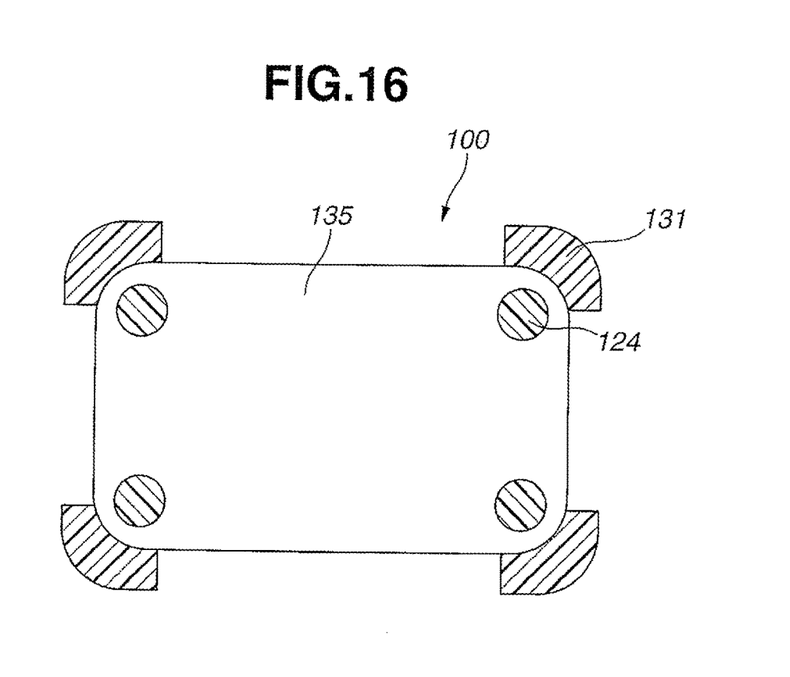
FIG. 16 is a sectioned view of the separator unit taken along the line D-D of FIG. 13.

As is seen from FIGS. 13, 15 and 16, the rectangular base plate 127 is formed with four connecting studs 131 that extend rightward in FIG. 13 from four corner portions of the rectangular base plate 127. As is seen from FIG. 13, a rectangular impinge plate 126 is integrally connected to right (or leading) ends of the four connecting studs 131. Thus, the rectangular base plate 127, the four connecting studs 131 and the rectangular impinge plate 126 constitute a generally a rectangular parallelepiped body.

As is seen from FIG. 15, the rectangular opening 128 of the rectangular base plate 127 is so sized as to receive the rectangularly swelled portion 123 of the rectangular perforated plate 120 as well as the four holding studs 124.

As is seen from FIG. 13, upon assembly of the separator unit 100, a rectangular fiber material piece 135 is put on the rectangular impinge plate 126 and pressed against the impinge plate 126 by the leading ends of the four holding studs 124. That is, as will be understood from FIG. 13, when the perforated plate 120 is intimately mated with the base plate 127 having the four holding studs 124 passed through the rectangular opening 128, the leading ends of the four holding studs 124 automatically press four peripheral portions of the rectangular fiber material piece 135 against the impinge plate 126.

Although not shown in the drawings, the rectangular base plate 127 is provided with a holder for holding the rectangular perforated plate 120. When the separator unit 100 is set in the separator chamber 5 (see FIG. 1), the outer peripheral portion of the base plate 127 is intimately and snugly put in the mounting grooves 2b and 3b formed in the housing part 2 and the separator cover 3.

The entire contents of Japanese Patent Application 2014-255668 filed Dec. 18, 2014 are incorporated herein by reference.

Although the invention has been described above with reference to embodiments of the invention, the invention is not limited to such embodiments as described above. Various modifications and variations of such embodiments may be carried out by those skilled in the art, in light of the above description.

What is claimed is:

1. An oil mist separator comprising:
    a housing body through which oil mist containing gas flows, the housing body including upper and lower members that are coupled to form therebetween a gas flow passage for the oil mist containing gas; and
    a separator unit installed in the gas flow passage, the separator unit comprising
        a front unit including a perforated plate and a plurality of holding studs extending rearward from the perforated plate;
        a rear unit placed behind the perforated plate, the rear unit including a base plate that is to be put on a rear surface of the perforated plate and has an opening sized to permit insertion of the holding studs of the front unit, a plurality of connecting studs extending rearward from the base plate and an impinge plate held by leading ends of the connecting studs; and
        a fiber material piece put on a front surface of the impinge plate,
    wherein when the front unit is coupled with the rear unit having the holding studs passed through the opening of the base plate, the fiber material piece is sandwiched between leading ends of the holding studs and the impinge plate.

2. An oil mist separator as claimed in claim 1, in which the impinge plate and the fiber material piece are respectively formed with openings.

3. An oil mist separator as claimed in claim 1, in which the opening of the base plate is sized to permit insertion of the fiber material piece into the rear unit.

4. An oil mist separator as claimed in claim 1, in which the fiber material piece is made of polyester fiber, acrylic fiber, aramid fiber, or PPS (polyphenylenesulfide) fiber.

5. An oil mist separator as claimed in claim 1, in which the fiber material piece is made of non-woven fabric or woven fabric.

6. An oil mist separator as claimed in claim 1, in which the upper and lower members of the housing body are formed, at inner surfaces of the upper and lower members, with mounting grooves for putting therein outer peripheral portions of the perforated plate and the base plate.

7. An oil mist separator as claimed in claim 6, in which the perforated plate and the base plate are substantially a same shape and a same size.

8. An oil mist separator comprising:
    a housing body through which oil mist containing gas flows, the housing body including upper and lower members that are coupled to form therebetween a gas flow passage for the oil mist containing gas and have, at respective inner surfaces, mounting grooves that form an endless mounting groove when the upper and lower members are coupled; and
    a separator unit installed in the gas flow passage, the separator unit comprising
        a front unit including a perforated plate and a plurality of holding studs extending rearward from the perforated plate;
        a rear unit placed behind the perforated plate, the rear unit including a base plate that is to be put on a rear surface of the perforated plate and has an opening sized to permit insertion of the holding studs of the front unit, a plurality of connecting studs extending rearward from the base plate and an impinge plate held by leading ends of the connecting studs; and
        a fiber material piece put on a front surface of the impinge plate,
    wherein when the front unit is coupled with the rear unit having the holding studs passed through the opening of the base plate, the fiber material piece is sandwiched between leading ends of the holding studs and the impinge plate, and
    wherein outer peripheral portions of the perforated plate and the base plate are put in the endless mounting groove of the housing body.

9. An oil mist separator comprising:
    a housing body through which an oil mist containing gas flows, the housing body including upper and lower members that are coupled to constitute therebetween a gas flow passage for the oil mist containing gas; and
    a separator unit installed in the gas flow passage, the separator unit comprising:
        a front unit including a perforated plate and a plurality of holding studs extending rearward from the perforated plate;
        a rear unit placed behind the perforated plate, the rear unit including a base plate that is to be intimately put on a rear surface of the perforated plate and has an opening sized to permit insertion of the holding studs of the front unit, a plurality of connecting studs extending rearward from the base plate and an impinge plate held by leading ends of the connecting studs; and
        a fiber material piece put on a front surface of the impinge plate,
    wherein when the front unit is coupled with the rear unit having the holding studs passed through the opening of the base plate, the fiber material piece is sandwiched between leading ends of the holding studs and the impinge plate.

* * * * *